(12) United States Patent
Furuya

(10) Patent No.: US 8,687,884 B2
(45) Date of Patent: Apr. 1, 2014

(54) IMAGE PROCESSING APPARATUS AND METHOD

(75) Inventor: Kohei Furuya, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 78 days.

(21) Appl. No.: 13/357,051

(22) Filed: Jan. 24, 2012

(65) Prior Publication Data

US 2012/0201453 A1   Aug. 9, 2012

(30) Foreign Application Priority Data

Feb. 4, 2011   (JP) ................................. 2011-023248

(51) Int. Cl.
*G06K 9/00* (2006.01)
(52) U.S. Cl.
USPC .......................................... 382/167; 382/162
(58) Field of Classification Search
USPC ................. 382/162, 167, 168, 254, 266, 274; 348/234, 229.1, E9.04; 358/445, 447, 358/448, 462, 464, 521, 3.01, 1.9, 3.26, 358/3.27
See application file for complete search history.

(56) References Cited

U.S. PATENT DOCUMENTS

| | | | | |
|---|---|---|---|---|
| 7,433,079 | B2 * | 10/2008 | Kotani | 358/1.9 |
| 7,940,426 | B2 * | 5/2011 | Kuwata et al. | 358/3.01 |
| 8,050,514 | B2 * | 11/2011 | Maeda | 382/274 |
| 8,355,059 | B2 * | 1/2013 | Fukui | 348/229.1 |

FOREIGN PATENT DOCUMENTS

| | | | | |
|---|---|---|---|---|
| JP | 2002-335536 | | 11/2002 | ............... H04N 9/64 |
| JP | 2007-243542 | | 9/2007 | ............. H04N 5/232 |

\* cited by examiner

*Primary Examiner* — Anh Do
(74) *Attorney, Agent, or Firm* — Cowan, Liebowitz & Latman, P.C.

(57) ABSTRACT

An image processing apparatus adapted to perform tone correction of luminance of an image, comprises: a image dividing unit configured to divide the image into a plurality of blocks; a calculation unit configured to calculate a plurality of feature amounts of each of the blocks including a luminance value and calculate a saturated feature amount based on the plurality of calculated feature amounts, wherein the saturated feature amount represents color deviation tendency when the tone correction is applied to the image using a reference tone correction characteristic; a changing unit configured to change the reference tone correction characteristic according to the calculated saturated feature amount; and a correction unit configured to perform the tone correction based on the changed reference tone correction, wherein the changing unit weakens a degree of the reference tone correction characteristic when the saturated feature amount indicates a stronger tendency toward color deviation.

20 Claims, 10 Drawing Sheets

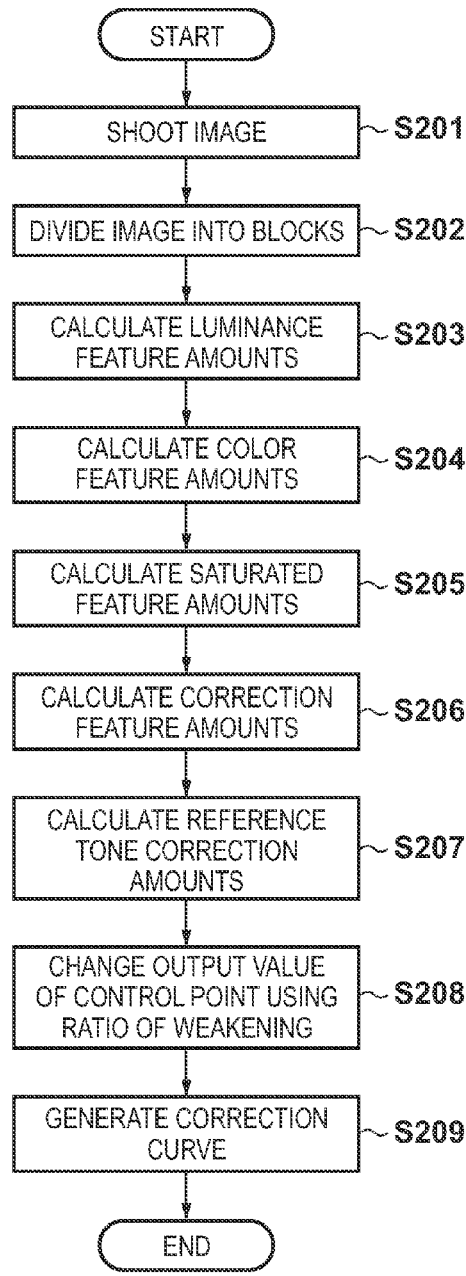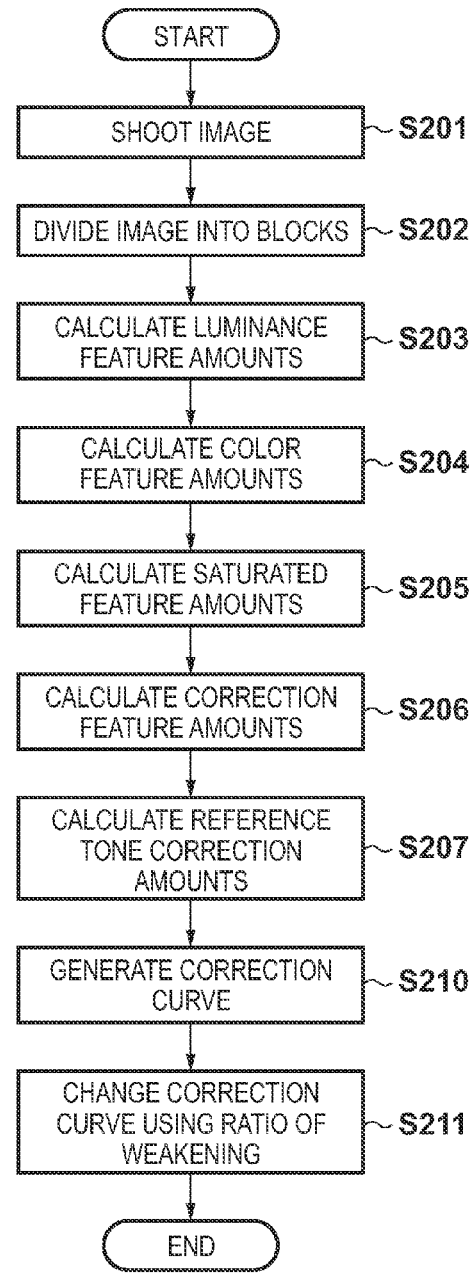

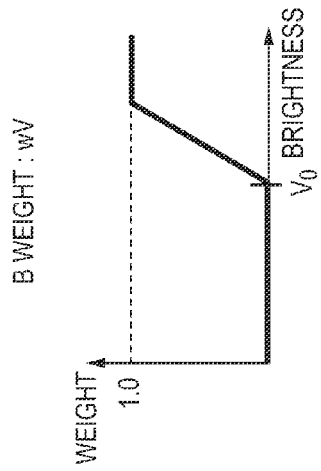
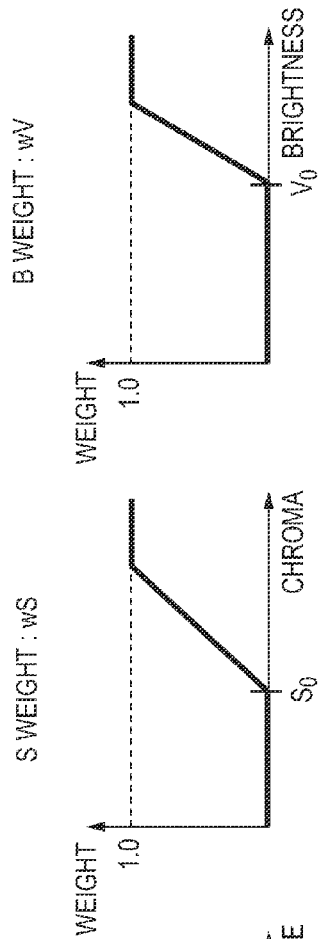
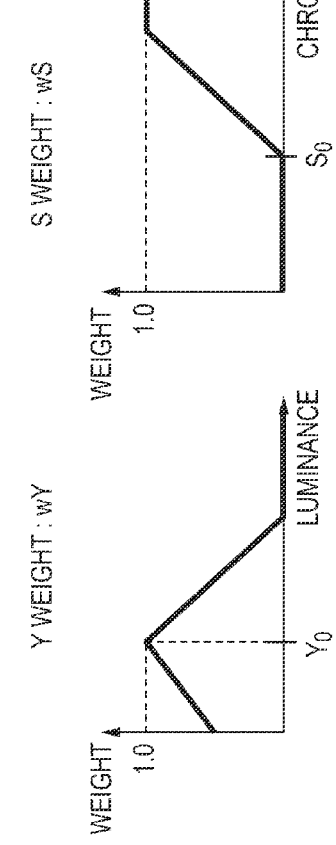
FIG. 3A  FIG. 3B  FIG. 3C
FIG. 3D

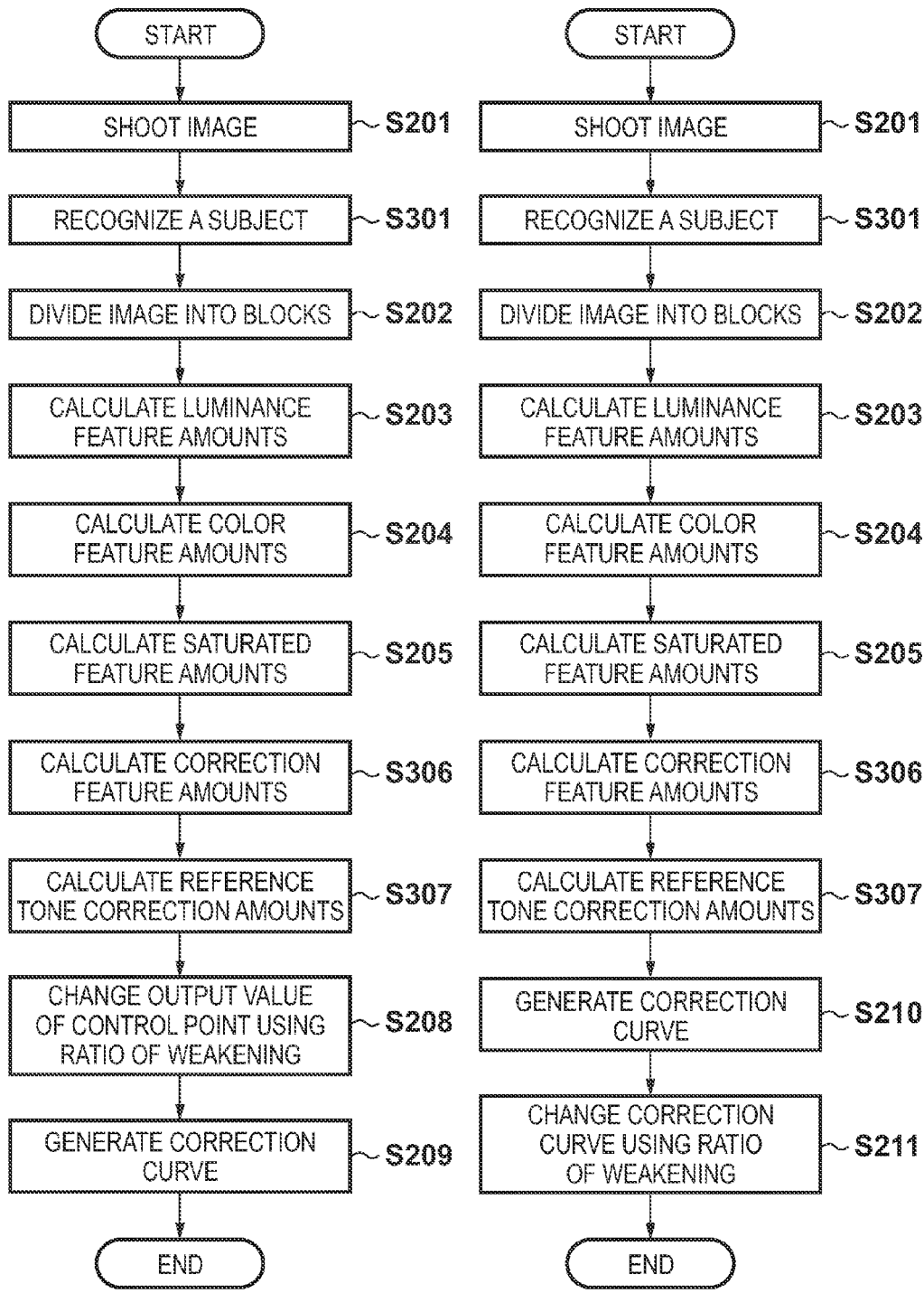

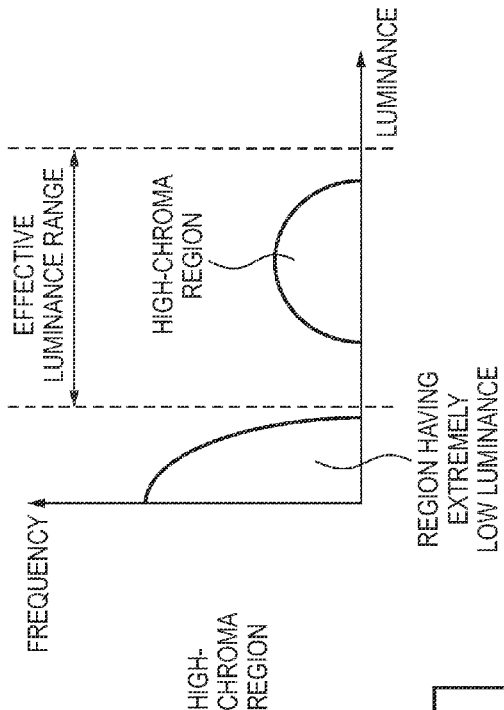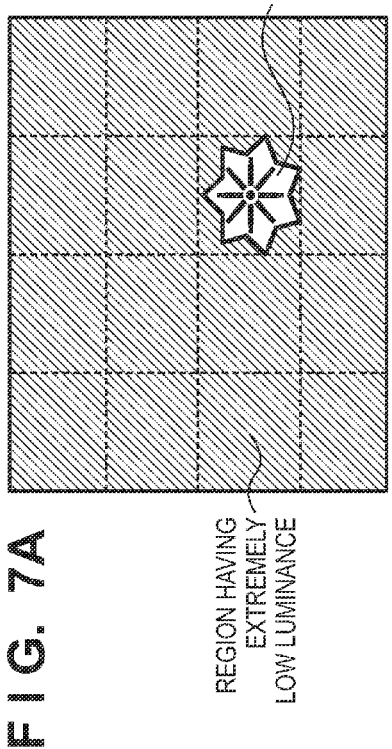

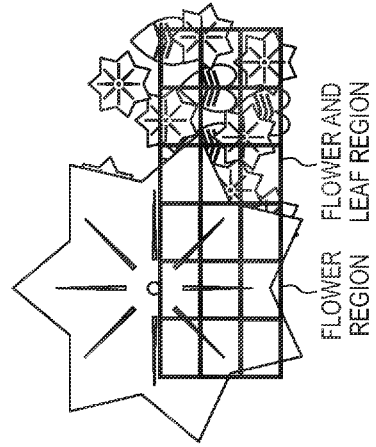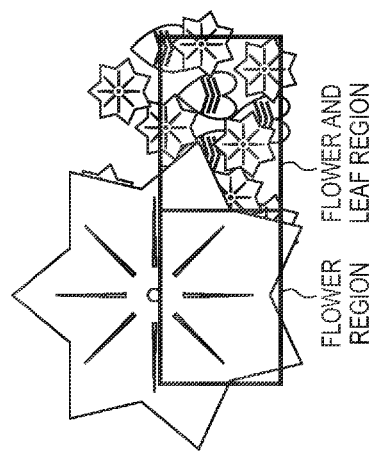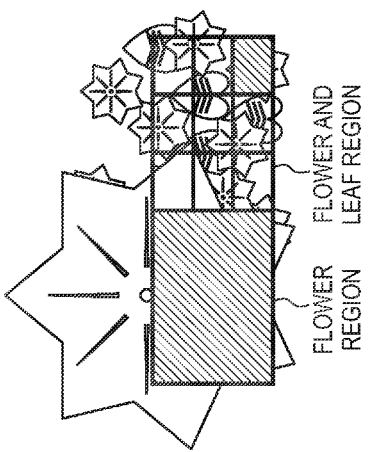

IMAGE PROCESSING APPARATUS AND METHOD

BACKGROUND OF THE INVENTION

1. Field of the Invention

The present invention relates to an image processing apparatus and method, and more particularly, to an image processing apparatus and a method which performs tone correction on inputted images.

2. Description of the Related Art

Conventional techniques for performing tone correction of images involve making shadow corrections to correct luminance of dark portions contained in the images, making contrast corrections to increase contrast of the images, and so on. For example, a large number of dark portions are contained in an image which has a luminance histogram such as shown in FIG. 10A, and if the luminance of the dark portions is increased using a correction curve such as shown in FIG. 10B, an image of more appropriate brightness can be obtained. In many photography scenes, such tone correction allows photographed images to be corrected into more desirable images.

However, when such a correction is applied to a scene whose image contains large high-chroma regions, the balance among color components of pixels in the high-chroma regions can be lost, resulting in color deviation. Suppose, for example, FIG. 10A is a luminance histogram of a scene in which a vivid red flower is shown in the center of an image and an 8-bit RGB value in part of the flower is RGB=(255, 56, 94). The luminance obtained from a conversion formula defined by sRGB and given by Eq. (1) below is Y=approximately 120.

$$Y=0.299R+0.587G+0.114B \quad (1)$$

The calculated luminance of 120 is plotted at a point indicated by x in the luminance histogram of FIG. 10A, and it can be seen that the luminance is not very high. The luminance undergoes a substantial correction as can be seen from the amount of correction for x in FIG. 10B. However, in order to apply shadow correction to such a region while maintaining RGB color balance, R needs to exceed 255. However, if one attempts to express the R, G, and B values in 8 bits, an R component is cropped at 255. As a result, only G and B components are raised with R remaining the same as before. Consequently, the RGB color balance changes from the original ratio, causing color deviation.

To deal with this problem, a technique disclosed in Japanese Patent Laid-Open No. 2007-243542 performs chroma correction by calculating chroma in a central portion of an image and determining an amount of correction based on a proportion of high-chroma pixels in the region and the like.

Also, a technique disclosed in Japanese Patent Laid-Open No. 2002-335536 calculates amounts of correction on a pixel by pixel basis at the luminance of the respective pixels, and then calculates actual amounts of correction by reducing the calculated amounts of correction differently according to the chroma of the pixels, where the higher the chroma, the greater the reduction.

However, when a technique, such as the technique disclosed in Japanese Patent Laid-Open No. 2007-243542, which is based solely on the proportion in which high-chroma pixels are contained in a given region, is applied to tone corrections, the amount of correction could be suppressed with respect to scenes to which tone correction can normally be applied safely. For example, in shadow correction, the amounts of correction are generally reduced with respect to regions whose luminance is too low or regions whose luminance is too high as shown in FIG. 10B, in order to give a more natural look. Even when tone correction such as shown in FIG. 10B is applied to a scene which contains a large number of high-chroma regions, if the regions have high luminance or low luminance, color deviation is less likely to occur. The correction such as shown in FIG. 10B may result in a good image corrected to an appropriate brightness as a whole. However, if tone correction is weakened simply for the reason that the scene contains a large number of high-chroma regions, tone corrections which are safe to make will also be suppressed.

On the other hand, a technique, such as the technique disclosed in Japanese Patent Laid-Open No. 2002-335536, which checks chroma and determines the amounts of correction on a pixel by pixel basis, needs to calculate information for determination of high chroma, including a hue and chroma, on a pixel by pixel basis, and then calculate an appropriate amount of correction at the chroma level of each pixel. Consequently, calculation time increases with increases in pixel count. Furthermore, if tone correction is applied on a pixel by pixel basis to a scene such as a flower whose chroma is not uniform and varies with the shade, although the amounts of correction of the regions whose chroma is saturated are suppressed, the surrounding regions whose chroma is not saturated are subjected to correction. Although this enables making corrections without causing chromatic saturation, chromatic details of the original image could be lost. As an example, FIG. 10C shows variations in the chroma of a linear region in a scene showing a vivid red flower. When corrections are made to the scene on a pixel by pixel basis, the variations in chroma become as shown in FIG. 10D. When FIG. 10C and FIG. 10D are compared, fine variations in chroma have been lost in FIG. 10D after the corrections. In particular, when chromatic details are reduced in high-chroma regions, one could feel as though there were color deviations even though actually there is no color deviation.

SUMMARY OF THE INVENTION

The present invention has been made in consideration of the above situation, and is designed to perform tone correction suitable for a high-chroma scene which is liable to undergo color deviation as a result of correction.

According to the present invention, provided is an image processing apparatus adapted to perform tone correction of luminance of an image, comprising: an image dividing unit configured to divide the image into a plurality of blocks; a calculation unit configured to calculate a plurality of feature amounts of each of the blocks including a luminance value and calculate a saturated feature amount based on the plurality of calculated feature amounts, wherein the saturated feature amount represents color deviation tendency when the tone correction is applied to the image using a reference tone correction characteristic; a changing unit configured to change the reference tone correction characteristic according to the calculated saturated feature amount; and a correction unit configured to perform the tone correction based on the reference tone correction characteristic changed by the changing unit, wherein the changing unit weakens a degree of the reference tone correction characteristic of the tone correction when the saturated feature amount indicates a stronger tendency toward color deviation.

According to the present invention, provided is an image processing method for performing tone correction of luminance of an image, comprising: a block dividing step of dividing the image into a plurality of blocks; a calculation step of calculating a plurality of feature amounts of each of the blocks including a luminance value and calculating a saturated feature amount based on the plurality of calculated feature amounts, wherein the saturated feature amount represents color deviation tendency when the tone correction is applied to the image using a reference tone correction characteristic; a changing step of changing the reference tone correction characteristic according to the calculated saturated feature amount; and a correction step of performing the tone correction based on the reference tone correction characteristic changed by the changing step, wherein the changing step weakens a degree of the reference tone correction characteristic of the tone correction when the saturated feature amount indicates a stronger tendency toward color deviation.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIGS. 2A and 2B are flowcharts showing tone correction processes according to first, third, and fourth embodiments;

FIGS. 3A to 3D are diagrams showing an example of weights used in calculating saturated feature amounts according to the first embodiment;

FIGS. 6A and 6B are flowcharts showing tone correction processes according to the second embodiment;

FIGS. 7A to 7C are diagrams showing an example of a scene containing an extremely low-luminance region according to the third embodiment;

FIGS. 8A to 8C are diagrams showing an example of how to select blocks according to the fourth embodiment;

DESCRIPTION OF THE EMBODIMENTS

Exemplary embodiments of the present invention will be described in detail in accordance with the accompanying drawings.

First Embodiment

In a first embodiment, description will be given of a method for calculating a saturated feature amount which corresponds to a color deviation tendency of a given scene of a photographic image and determining an amount of correction for actual use according to the saturated feature amount.

Figure 1:
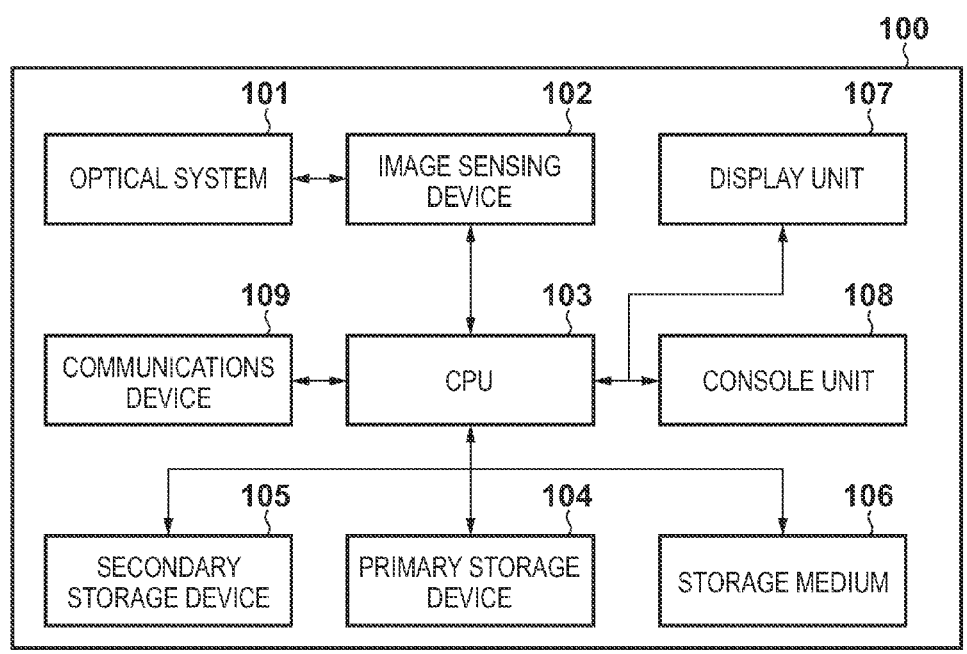
FIG. 1 is a block diagram showing a schematic configuration of an image sensing apparatus according to an embodiment of the present invention.

FIG. 1 is a block diagram showing a configuration of an image sensing apparatus 100 as an example of an image processing apparatus according to the first embodiment. The image sensing apparatus 100 can be a digital camera, digital video camera, or other apparatuses which can obtain image data by imaging a subject. In FIG. 1, an optical system 101 is made up of a lens, shutter, and diaphragm and is adapted to focus an appropriate amount of light from a subject onto an image sensing device 102 with an appropriate timing. The image sensing device 102 converts the light focused through the optical system 101 into image data. A CPU 103 performs various computations and controls various parts of the image sensing apparatus 100 according to inputted signals and a program.

A primary storage device 104 is adapted to store temporary data and used as a workspace for the CPU 103. A secondary storage device 105 stores a program (firmware) and various settings information used to control the image sensing apparatus 100. A storage medium 106 stores photographic image data and the like. The storage medium 106 is able to be removed after photo-taking and inserted into a personal computer or the like to read data. That is, the image sensing apparatus 100 may be of any type as long as it has capabilities to access the storage medium 106 and read and write data from/to the storage medium 106. A display unit 107 is adapted to display a viewfinder image during photo-taking, display photographed images, display characters for interactive operation, and so on. A console unit 108 is used to accept user actions. Buttons, levers, a touch panel, and the like can be used for the console unit 108.

A communications device 109 is adapted to connect to external devices and exchange control commands and data therewith. PTP (Picture Transfer Protocol) is used as a protocol in establishing a connection and conducting data communications. The communications device 109 may conduct communications via a wired connection such as a USB (Universal Serial Bus) cable or via a wireless connection such as a wireless LAN. Also, the communications device 109 may connect to the external devices directly, via a server, or via a network such as the Internet.

According to the first embodiment, FIG. 2A is a diagram showing a flow of correcting luminance tone for an image. With reference to FIG. 2A, a description will be given below of an example of calculating a saturated feature amount which corresponds to a color deviation tendency of a photographic image and weakening an amount of correction for actual use according to the saturated feature amount.

First, an image is shot through the optical system 101 and image sensing device 102 (step S201). Then, the CPU 103 divides the obtained image into plural blocks (step S202). Incidentally, according to the first embodiment, the number of divided blocks has been prescribed in advance, but may be changed according to the photography scene or subject. Also, an image stored in the storage medium 106 may be read out and handled in this step.

Next, the CPU 103 calculates a luminance feature amount of each of the blocks obtained in step S202 (step S203). According to the first embodiment, the CPU 103 acquires average values of 8-bit RGB signals of the pixels contained in each block, calculates an 8-bit luminance signal Y using above-described Eq. (1) as the luminance feature amount of the block. Incidentally, the luminance feature amount does not always need to be calculated from the average values of RGB signals. For example, a conceivable method involves calculating respective signal values (boundary values) Mr, Mg, and Mb for R, G, and B signals of the pixels in the block such that the number of pixels whose R, G, and B signal values are equal to or larger than the respective signal values Mr, Mg, and Mb will respectively make up N % of all the pixels in the block, and then calculating the luminance signal Y from the values of Mr, Mg, and Mb using Eq. (1). Also, although in the first embodiment, the luminance signal Y is calculated using Eq. (1), this is not restrictive, and the G signal may be used directly in a simplified manner or the luminance feature amount may be obtained by adding other information.

Once the luminance feature amount of each block is obtained in step S203, the CPU 103 further calculates a color feature amount of each block (step S204). According to the first embodiment, the CPU 103 calculates an 8-bit chroma signal S and brightness signal V from average values R, G, B of the RGB signals of each block obtained in step S203, using Eq. (2) below, and designates the chroma signal S and brightness signal V as a color feature amount of the block.

$$S = \begin{cases} 0, & V = 0 \\ \dfrac{\max(R, G, B) - \min(R, G, B)}{\max(R, G, B)}, & V > 0 \end{cases}$$
$$V = \max(R, G, B)$$
(2)

where max(R, G, B) is the largest of R, G, and B values and min(R, G, B) is the smallest of R, G, and B values.

As with the luminance feature amount, the color feature amount does not always need to be calculated from the average values of RGB signals. For example, a conceivable method involves calculating respective signal values (boundary values) Mr, Mg, and Mb for R, G, and B signals of the pixels in the block such that the number of pixels whose R, G, and B signal values are equal to or larger than the respective signal values Mr, Mg, and Mb will respectively make up N % of all the pixels in the block, and then calculating the chroma signal S and brightness signal V from the values of Mr, Mg, and Mb using Eq. (2). Incidentally, although according to the first embodiment, the chroma signal S and brightness signal V are calculated using Eq. (2), the color feature amount may be defined by one of the two signals, or by adding other information.

After the luminance feature amounts and color feature amounts are calculated on a block by block basis in steps S203 and S204, the CPU 103 calculates saturated feature amounts (step S205). The saturated feature amount represents the color deviation tendency resulting from tone correction, thus the higher the degree to which each block satisfies the conditions described below, the higher the saturated feature amount is set to be.
(1) The luminance is neither too high nor too low.
(2) The difference between a maximum value and minimum value of a signal component (e.g., RGB) of a pixel is large.
(3) Any of signal components of a pixel is close to a maximum value (255 in the case of an 8-bit signal).

First, whether or not condition (1) is satisfied can be determined based on the luminance Y calculated in step S203. As described above, the amount of tone correction is generally reduced in the case of regions having too low luminance or too high luminance. Thus, when a block satisfies condition (1), this means that the block is susceptible to tone correction and that the signal components in the block will change greatly as a result of the tone correction.

Next, whether or not condition (2) is satisfied can be determined based on the chroma S calculated in step S204. Depending on the tone correction technique, differences among signal components of the pixel may be small. Thus, when a block satisfies condition (2), this means that the difference between a maximum signal component and minimum signal component in the block could become small after correction even if the difference is large before the correction.

Also, whether or not condition (3) is satisfied can be determined based on the brightness V calculated in step S204. When tone correction is applied in such a way as to increase brightness, the signal components of the pixel subjected to the correction are increased in value. However, when condition (3) is satisfied, this means that the increased value of the signal component could exceed the maximum value available to the signal component, resulting in color deviation.

According to the first embodiment, in order to determine whether or not conditions (1) to (3) are satisfied, luminance weights, chroma weights, and brightness weights are calculated based on the luminance feature amount and color feature amount obtained in steps S203 and S204, and a combination of all thereof is used as a saturated feature amount of the given block. The weights are calculated using lines, such as shown in FIGS. 3A to 3C, prepared in advance.

FIG. 3A, which corresponds to condition (1), shows a line graph for use to calculate luminance weights according to the luminance feature amount. The line graph is made up of a polygonal line peaking at a predetermined luminance value $Y_0$. The predetermined luminance value $Y_0$ has its value varied based on a reference correction line (correction characteristics) to detect accurately whether or not a correction will cause color deviation. For example, when the reference correction line is used to increase the size and brightness of a dark portion, the value of $Y_0$ is set close to the dark portion and when the reference correction line is used to increase the size and brightness of a light portion, the value of $Y_0$ is set close to the light portion.

FIG. 3B, which corresponds to condition (2), shows a line graph for use to calculate chroma weights according to the value of chroma S which is a color feature amount. When a predetermined chromatic value $S_0$ is exceeded, the weight is increased to ensure that the saturated feature amount will take a value which represents a stronger tendency toward color deviation.

FIG. 3C shows a line graph for use to calculate brightness weights according to the value of brightness V which is a color feature amount. When a predetermined brightness value $V_0$ is exceeded, the weight is increased to ensure that the saturated feature amount will take a value which represents a stronger tendency toward color deviation.

The combination of all the weighted feature amounts are designated as the saturated feature amount of the given block. Incidentally, although in the first embodiment, the maximum values of the weights for the three types of feature amount are set to the same value as shown in FIGS. 3A to 3C, this is not always necessary. For example, the maximum value of weights for the luminance feature amount may be set to a smaller value than the maximum value of the weights for the other feature amounts to reduce the influence of luminance.

In step S205, the CPU 103 calculates the saturated feature amounts on a block by block basis using Eq. (3), and further calculates the saturated feature amount of the entire image of the scene. According to the first embodiment, the saturated feature amount C of the entire image is calculated from the saturated feature amounts $c_i$ calculated on a block by block basis, using Eq. (3) below.

$$c_i = wY(Y_i) \times wS(S_i) \times wV(V_i)$$
(3)

-continued $$C = \frac{c_1 + c_2 + \ldots + c_N}{N}$$

where $Y_i$, $S_i$, and $V_i$ are the luminance value, chromatic value, and brightness value of the ith block, respectively; N is the number of blocks; and $wY(Y_i)$, $wS(S_i)$, and $wV(V_i)$ are output weights obtained, respectively, from input values $Y_i$, $S_i$, and $V_i$ based on FIGS. 3A to 3C.

Although the saturated feature amounts are calculated in Eq. (3) by treating all the blocks equivalently, different weights may be assigned to different areas to carry out calculations based on Eq. (4) below by increasing weights W(i) assigned to blocks nearer to the center, for example, as shown in FIG. 3D.

$$c_i = wT(Y_i) \times wS(S_i) \times wV(V_i) \times W(i) \quad (4)$$

$$C = \frac{c_1 + c_2 + \ldots + c_N}{\sum_{i=1}^{N} W(i)}$$

Figure 4A:
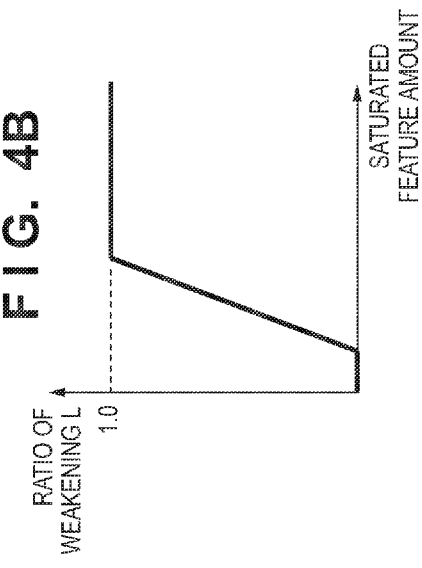
FIGS. 4A to 4D are diagrams showing an example of how to weaken amounts of correction according to the first embodiment.
Figure 4B:
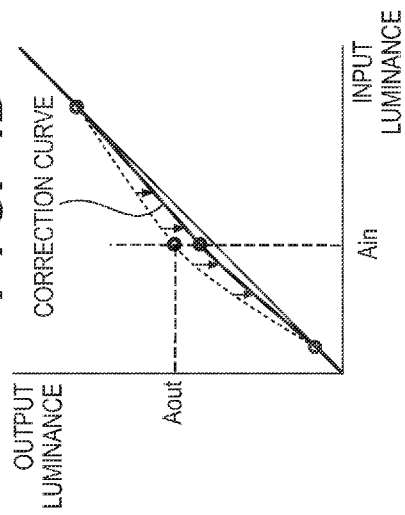
Figure 4C:
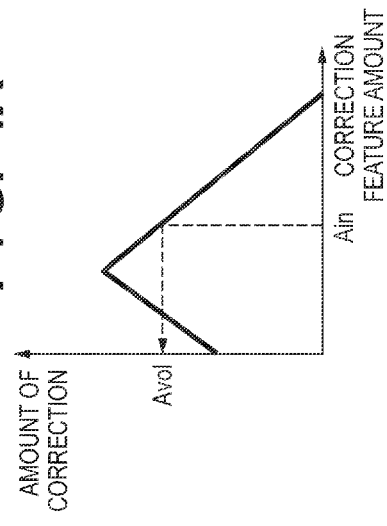

Once the saturated feature amount of the scene is calculated in step S205, the CPU 103 generates a correction curve for tone correction of the scene. First, the CPU 103 calculates correction feature amounts for use to determine reference correction characteristics (tone correction characteristics) (step S206). In calculating the correction feature amounts, the CPU 103 establishes a curve such as shown in FIG. 4A. If the average value of a histogram obtained as a correction feature amount is Ain, the amount of correction is Avol. When the average value of the histogram exceeds a predetermined value as shown in FIG. 4A, the larger the average value, the smaller the amount of correction is set to be. Then, based on the calculated correction feature amounts, the CPU 103 calculates a reference tone correction amount suitable for the scene (step S207). The reference tone correction amount can be calculated using the average value of the histogram obtained in step S206 as input, based on the relationship shown in FIG. 4A. Normally, output luminance Aout (=Ain+Avol) is calculated using the correction feature amounts obtained in step S206 as input luminance Ain, based on the reference tone correction amount obtained in step S207. Next, by setting a control point at an intersection of Ain and Aout as shown in FIG. 4C, the CPU 103 acquires a correction curve for tone correction such as indicated by a broken line in FIG. 4C. Such a correction curve is useful in making a desirable correction, provided the scene does not contain a high-chroma region. However, if the scene contains high-chroma regions, the use of a correction curve such as indicated by the broken line in FIG. 4C could cause color deviation in the high-chroma regions. Thus, the correction curve is varied based on the saturated feature amount obtained in step S205.

To vary the correction curve, first in step S208, the CPU 103 weakens the reference tone correction amount calculated in step S207, according to the saturated feature amount. For example, by defining a relationship between the saturated feature amount and a ratio of weakening L as shown in FIG. 4B, the ratio of weakening L to be applied to the amount of correction of the scene can be calculated from the calculated saturated feature amount. The output luminance Aout is changed from the input luminance Ain based on Eq. (5) below, using the ratio of weakening L.

$$A\text{out}' = A\text{in} + (A\text{out} - A\text{in}) \times (1-L) \quad (5)$$

This makes it possible to calculate a correction curve which can address a scene which is likely to undergo color deviation, by establishing control points at points Ain and Aout' as shown in FIG. 4C (step S209). To prevent darkening of dark portions and highlight-detail loss of light portions, control points may be added also to the dark portions and light portions.

Figure 4D:
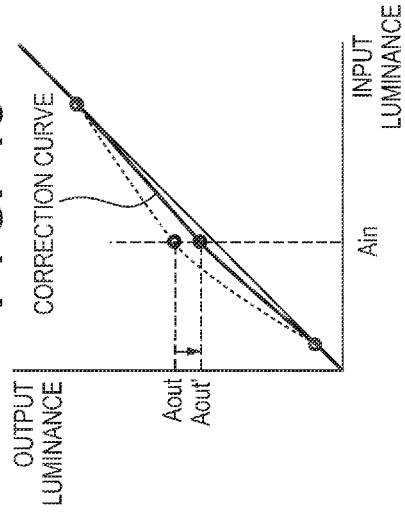

Also, the correction curve may be found before placing restrictions using the saturated feature amount. In that case, steps S210 and S211 are carried out as shown in FIG. 2B instead of steps S208 and S209. This makes it possible to calculate the correction curve from control points as indicated above by a broken line in FIG. 4D, then weaken the amount of correction of the entire correction curve, and thereby calculate a correction curve suitable for a scene which is likely to undergo color deviation. For example, if a correction curve Yout=f(Yin) is obtained in step S210, it is possible to calculate a correction curve Yout'=f(Yin) suitable for a scene which is likely to undergo color deviation based on the ratio of weakening L, using Eq. (6) below.

$$Y\text{out}' = Y\text{in} + (Y\text{out} - Y\text{in}) \times (1-L) \quad (6)$$

Next, a luminance tone correction is made using the changed correction curve.

As described above, according to the first embodiment, luminance is used as a criterion in calculating the saturated feature amount of a scene. This makes it possible to reduce color deviation of high-chroma scene prone to color deviation when corrections are made and make appropriate corrections to a scene less prone to color deviation in spite of high chroma when corrections are made.

Furthermore, by dividing an image into blocks and processing the image on a block by block basis, it is possible to check whether or not there is a region which as a whole is likely to undergo color deviation rather than whether or not local pixels are likely to undergo color deviation. This enables making more desirable corrections to a scene containing chromatic variations.

Second Embodiment

An example of weakening the amount of correction when there are a large number of regions which are likely to undergo color deviation has been described in the first embodiment, but a desirable ratio of weakening varies with the photography scene. Thus, in the second embodiment, the way of weakening the amount of correction is varied with the photography scene.

Figure 5A:
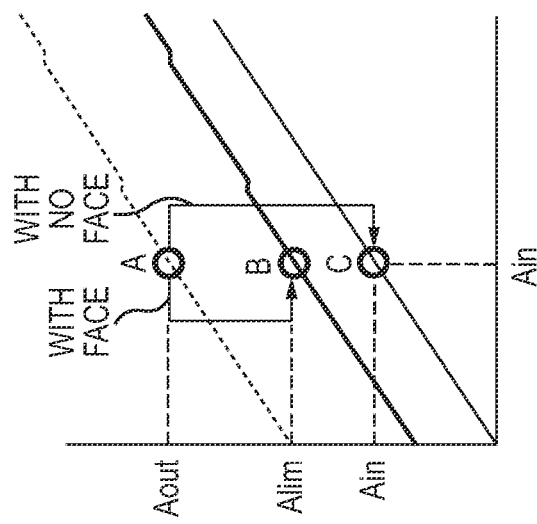
FIGS. 5A and 5B are diagrams showing an example of how to weaken amounts of correction in a scene with a face and a scene with no face according to a second embodiment.
Figure 5B:
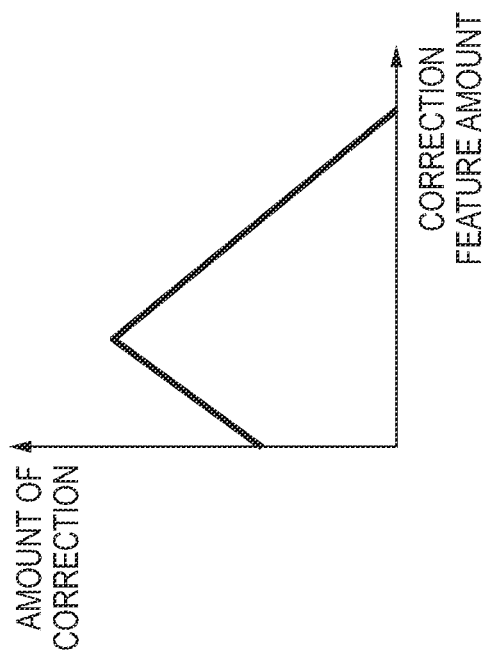

Examples of differences in the photography scene include the presence or absence of a face. Let us consider a case in which a correction curve for use to correct luminance Ain to luminance Aout has been calculated as shown by a broken line in FIG. 5B. FIG. 5B is an enlarged view of a section around Ain in the correction curve of FIG. 4C. If the screen contains a wide high-chroma region, but no face, human attention tends to be focused on the high-chroma region. Therefore, if correction of such a scene can result in color deviation of the high-chroma region, it is highly likely that the correction will go well if importance is given to reduction of color deviation. Thus, in such a case, the higher the likelihood of color deviation, the more the tone correction is weakened. The control point is brought closer to a point C in FIG. 5B to make the less correction to be applied to the high-chroma region.

However, if there is a face as well as a wide high-chroma region which is likely to undergo color deviation, human attention tends to be drawn to both the high-chroma region and the face. Therefore, in the case where the facial region is originally dark, even though there is a wide region which is likely to undergo color deviation, if tone correction is weakened too much, an image undesirable in terms of the face will result. That is, in the case of a scene with a face, if the control point is brought close to the point C in FIG. 5B as in the case of a scene without a face, it will become impossible to correct the dark face even if the two scenes are similar.

To deal with this, a control point B different from the point C is set in advance in a scene with a face. The higher the likelihood of the scene to undergo color deviation, the closer the control point is brought to the point B, to apply necessary correction to some extent while reducing color deviation. Thus, in the second embodiment, as shown in FIGS. 6A and 6B, the process of recognizing a subject (step S301) is added to the flowcharts according to the first embodiment described in FIGS. 2A and 2B, and a correction feature amount calculation process (step S306) and correction amount calculation process (step S307) different from the first embodiment are performed. Other processes are the same as the first embodiment described above, and thus the same reference numerals as in FIGS. 2A and 2B are used and description will be omitted as appropriate.

According to the second embodiment, the CPU 103 detects a subject in the image obtained in step S201 (step S301). Next, in steps S202 to S205, the CPU 103 calculates the saturated feature amounts in the manner described in the first embodiment.

Next, the CPU 103 calculates the correction feature amount (step S306). According to the second embodiment, if, for example, a face is detected as a subject in step S301, the luminance of the face is calculated as the correction feature amount. If no face is detected, the CPU 103 determines the correction feature amount in the same manner as in step S206 of FIGS. 2A and 2B. For example, if the average value of a histogram obtained as a correction feature amount is Ain, the amount of correction of the average value Ain becomes Avol. Consequently, by establishing a curve such as shown in FIG. 5A, the amount of correction can be decreased gradually with increases in the average value of the histogram over a predetermined value. Once the correction feature amount is calculated, the CPU 103 calculates a reference tone correction amount according to the luminance of the face, using the relationship shown in FIG. 5A (step S307).

Once the reference tone correction amount is calculated in step S307, the CPU 103 determines the ratio of weakening L and generates a correction curve in steps S208 and S209 or in steps S210 and S211. In step S209 or S211, the ratio of weakening L is varied depending on whether or not a specific subject has been detected in step S301.

For example, whereas in the first embodiment, the output luminance Aout is changed from the input luminance Ain based on Eq. (5), in the second embodiment, the output luminance Aout is changed from the input luminance Ain based on Eq. (7) below.

$$A\text{out}' = A\text{out}, A\text{out} \leq A\text{lim}$$

$$A\text{out}' = A\text{lim} + (A\text{out} - A\text{lim}) \times (1-L), A\text{out} > A\text{lim} \quad (7)$$

where Alim is a minimum guaranteed tone correction amount and set to a higher value than Ain.

Consequently, when a scene has a very high likelihood of color deviation and contains no face, if the control point is moved from the point A to the point C as shown in FIG. 5B, the amount of correction can be restricted. When a similar scene contains a face, if the control point is moved from the point A to the point B as shown in FIG. 5B, the overall amount of correction can be restricted while making some corrections to the face.

As described above, the second embodiment can calculate a more desirable amount of correction with respect to a scene containing a specific subject such as a face which can draw the user's attention.

Note that although a human face is detected as a specific subject in the second embodiment described above, the present invention is not limited to this and may be applied to any subject as long as the subject is specified in advance.

Third Embodiment

The proportion of a region which is likely to undergo color deviation in the entire screen is checked in the first embodiment, but if, for example, extremely dark/light regions are contained in the screen, human attention tends to be drawn to a region of appropriate brightness excluding the extremely dark/light regions. For example, FIG. 7A shows a scene in which the region other than a high-chroma region is extremely dark. If the region other than a high-chroma region have some appropriate luminance as in the case of a normal landscape rather than having extremely low luminance such as shown in FIG. 7A and the high-chroma region makes up a small proportion of the entire screen, human attention is less prone to be drawn to the high-chroma region. In such a case, if the luminance of the region other than the high-chroma region is only slightly dark, corrections made to increase brightness of the dark region tend to produce a more desirable image. However, in FIG. 7A, the region other than the high-chroma region has extremely low luminance and has a histogram such as that shown in FIG. 7B. In such a case, human attention tends to be drawn to the high-chroma region in FIG. 7A. In such a scene, even though the high-chroma region makes up a small proportion of the entire screen, if the ratio of weakening of correction is reduced as in the case of normal scenes, color deviation could occur in the high-chroma region which tends to draw attention.

Thus according to the third embodiment, a plurality of luminance thresholds are set, as indicated by broken lines in FIG. 7B. Next, in calculation of the luminance feature amount and color feature amount, pixels within the thresholds are used as valid pixels to calculate the feature amount of the block, and an amount of correction more suitable for the scene is calculated.

A flow of basic processes according to the third embodiment is similar to the flow according to the first embodiment described with reference to FIGS. 2A and 2B, but operations of a luminance feature amount calculation process in step S203 and color feature amount calculation process in step S204 differ from the first embodiment. Whereas in the first embodiment, the luminance feature amount and color feature amount are calculated from the R, G, and B averages of all the pixels in the block, in the third embodiment, luminance thresholds are set and R, G, and B average values are calculated using only the pixels within a threshold range. As the thresholds are set for luminance, a parameter used in determining the R, G, and B averages varies with the extent to which extremely dark/light regions are contained in the block. Consequently, reliability of each block varies with the effective pixel count which represents the number of pixels whose luminance is within the threshold range in the block. Thus, if the weight W(i) in Eq. (4) described above is used as the effective pixel count of the block, the saturated feature amount C can be calculated by taking the reliability into consideration. This process can be applied to the scene shown in FIG. 7A as follows.

First, saturated feature amounts $c_i$ are determined on a block by block basis. As a result, the saturated feature amounts $c_i$ of low-luminance blocks are close to 0 and the saturated feature amounts $c_i$ of high-chroma regions are close to 1, as shown in FIG. 7C. Then, the saturated feature amount of the entire scene is determined using Eq. (3) as in the case of the first embodiment, and the result is as shown by Eq. (8) below.

$$C = \frac{0.0 + 0.0 + \ldots + 1.0 + \ldots + 0.0}{N} \frac{1}{16} \quad (8)$$

In this way, although most regions in the screen have extremely low luminance and a high-chroma region tends to draw attention, actually the saturated feature amount C of the scene is estimated to be low. Thus, in the third embodiment, the effective pixel count within the effective luminance range described above is taken into consideration. For example, in a scene such as shown in FIG. 7A, the effective pixel count of the region having extremely low luminance is set close to 0 as with $e_i$ values shown in FIG. 7C. With this in view, when $e_i$ is used as the weight W(i) in Eq. (4), the saturated feature amount C of the entire scene becomes as shown by Eq. (9) below.

$$C = \frac{0.0 * 0.0 + 0.0 * 0.0 + \ldots + 1.0 * 0.9 + \ldots + 0.0 * 0.0}{0.0 + 0.0 + \ldots + 0.9 + \ldots + 0.0} = 1.0 \quad (9)$$

In this way, since a high-chroma region can be estimated to have a high saturated feature amount of a scene which tends to draw attention, it is possible to calculate an ratio of weakening appropriate for a high-chroma region.

As described above, the third embodiment can calculate a more desirable tone correction amount with respect to a scene containing a large number of extremely dark/light regions.

Fourth Embodiment

In a fourth embodiment, an example of a method for dividing an image into blocks will be described. Regarding the size of the blocks, the larger the size, the easier it is to recognize regions which are likely to undergo color deviation, as an area in the image. Therefore, division into large-size blocks makes it easy to recognize and detect regions which are likely to undergo color deviation, for example, when a large part of a block is occupied by a specific subject such as a high-chroma building or car or in the case of macro-photography of a flower. However, when a block contains different subjects, such as when a block contains both flowers and leaves as in a distance shot of a high-chroma plant, the subjects are averaged, and consequently, the chroma is estimated to be low.

Let us take as an example a scene shown in FIGS. 8A to 8C. In FIG. 8A, the scene is divided into large-size blocks and two of the blocks are extracted. In this case, the block on the left side is almost entirely occupied by a flower region. Consequently, even if there are some variations in chroma within the range, the region which is likely to undergo color deviation can be recognized as an area. However, the block on the right side contains both flowers and leaves, which consequently are averaged, making it impossible to extract the block as a region which is likely to undergo color deviation.

In FIG. 8B, the scene is divided into small-size blocks and 18 of the blocks are extracted. In this case, each of the nine blocks on the right side corresponds to either a flower region or leaf region. This makes it possible to extract regions which are likely to undergo color deviation and regions which are not likely to undergo color deviation. In contrast, the nine blocks on the left side cause the large flower to be looked at closely. Consequently, if the flower has shades, influence of fine chromatic variations comes into play, making it impossible to see whether or not the flower is likely to undergo color deviation as a whole. The fourth embodiment allows a more desirable tone correction amount to be calculated even in such a case.

A flow of basic processes according to the fourth embodiment is similar to the flow according to the first embodiment described with reference to FIGS. 2A and 2B, but the fourth embodiment differs from the first embodiment in that an image is divided into blocks of different sizes. In the first embodiment described above, in calculating the luminance feature amounts and color feature amounts of blocks in steps S203 and S204, R, G, and B average values are calculated on a block by block basis and luminance values, chromatic values, and brightness values are calculated therefrom. On the other hand, in the fourth embodiment, two different block sizes are defined in advance. Regarding the larger block size, average values AveRL, AveGL, and AveBL of the R values, G values, and B values of the pixels contained in the blocks as well as variances VarR, VarG, and VarB of the R values, G values, and B values of the pixels contained in the blocks are determined in advance. Regarding the smaller block size, average values AveRS, AveGS, and AveBS of the R values, G values, and B values of the pixels contained in the blocks are calculated in advance.

That is, the average value and variance of each block in FIG. 8A and the average value of each block in FIG. 8B are calculated. Next, variances of the larger blocks are checked. The variances are low when a block contains only a flower as in the case of the block on the left side of FIG. 8A. Conversely, the variances have high values when a block contains different subjects such as flowers and leaves as in the case of the block on the right side of FIG. 8A. That is, in such a case, preferably smaller-size blocks are used for determination instead of the larger-size block. Thus, when the variances calculated from a larger-size block are larger than a predetermined threshold, the average values calculated from smaller-size blocks are used. On the other hand, when the variances calculated from a larger-size block are equal to or smaller than the threshold, the average values calculated from the larger-size block are used as they are. Incidentally, in the thresholding, determinations can also be made based on, for example, whether or not the average value or maximum value of VarR, VarG, and VarB is larger than a certain threshold Th. Consequently, as shown in FIG. 8C, the average value calculated from the larger-size block can be used when only a flower region is contained in the block and the average values calculated from smaller-size blocks can be used when a flower region and leaf region are contained in the block.

In so doing, if Eq. (4) is used to calculate the saturated feature amounts and the pixel count of each block is used as the weight W(i), the saturated feature amounts can be calculated by taking the block sizes into consideration.

Incidentally, although two block sizes are used for division in the fourth embodiment, three or more block sizes may be used alternatively.

While exemplary embodiments of the present invention have been described above, it is to be understood that the present invention is not limited to the disclosed exemplary embodiments and that various modifications and changes can be made within the scope of the invention.

Other Embodiments

It should be noted that the present invention may be applied to a system made up of two or more devices (e.g., a host computer, interface device, camera head, scanner, and the like) as well as to an apparatus (e.g., a digital still camera, digital video camera, or the like) made up of a single device.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

Figure 9:
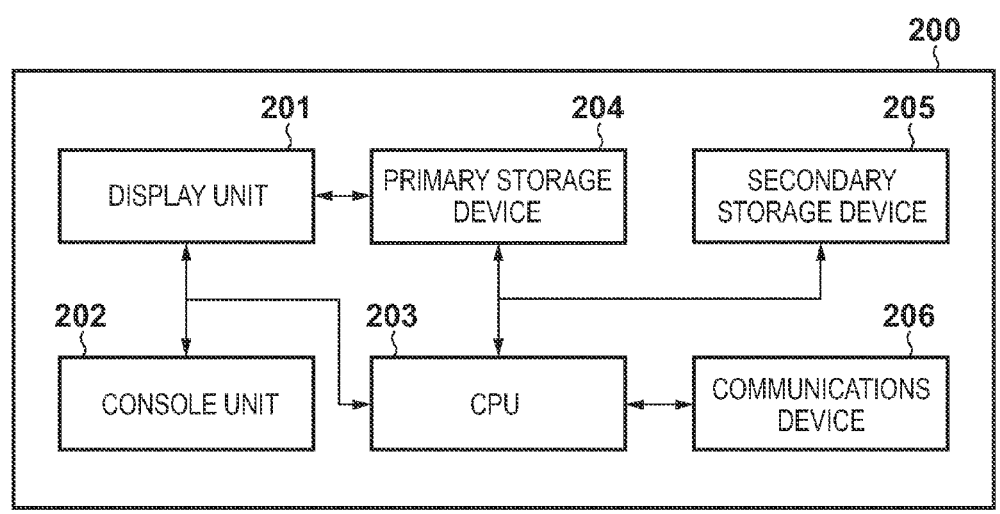
FIG. 9 is a block configuration diagram showing an information processing apparatus according to an embodiment.
Figure 10A:
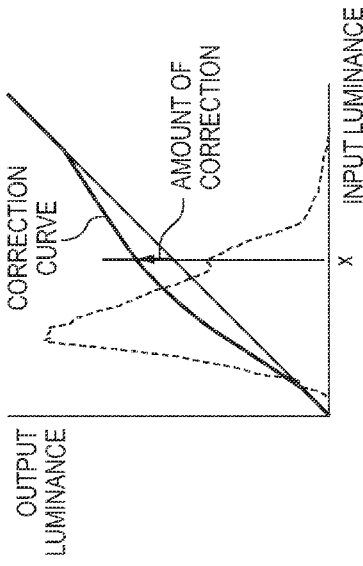
FIGS. 10A to 10D are diagrams illustrating conventional problems with high-chroma scenes.
Figure 10B:
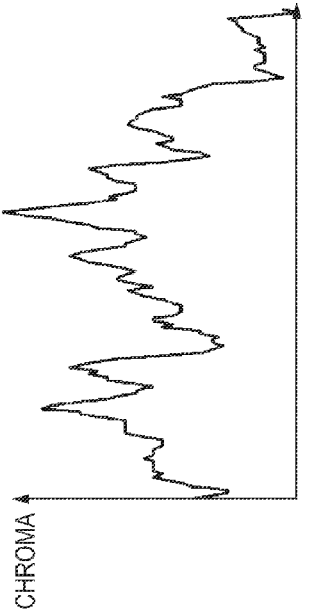
Figure 10C:
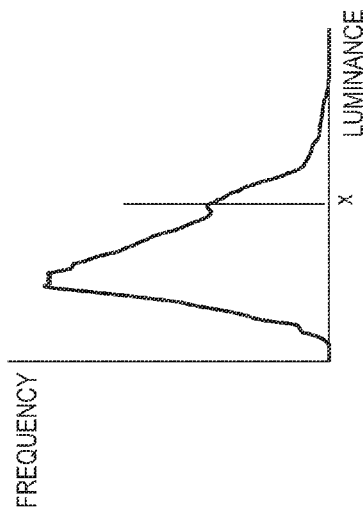
Figure 10D:
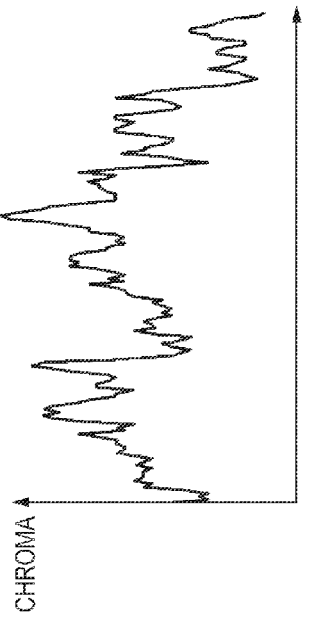

FIG. 9 is a block diagram showing a schematic configuration of an information processing apparatus 200 capable of implementing the present invention using the program described above. In FIG. 9, a display unit 201 displays images before image processing, images after image processing, characters for interactive operation, and the like. A console unit 202 is used to accept user actions. A keyboard, pointing device, and the like can be used for the console unit 202. A CPU 203 performs various computations and controls respective parts of the information processing apparatus 200 according to inputted signals and a program. A primary storage device 204 is adapted to store temporary data and used as a workspace for the CPU 203. A secondary storage device 205 stores a program and various settings information used to perform image processing. A communications device 206 connects to external devices and exchanges control commands and data therewith. A form similar to the communications device 109 may be selected for the communications device 206.

When the present invention is implemented by the information processing apparatus 200, images stored in the secondary storage device 205 or images in general acquired via the communications device 206 may be processed, and the images which can be processed are not limited to photographic images.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-023248, filed on Feb. 4, 2011 which is hereby incorporated by reference herein in its entirety.

What is claimed is:

1. An image processing apparatus adapted to perform tone correction of luminance of an image, comprising:
an image dividing unit configured to divide the image into a plurality of blocks;
a calculation unit configured to calculate a plurality of feature amounts of each of the blocks including a luminance value and calculate a saturated feature amount based on the plurality of calculated feature amounts, wherein the saturated feature amount represents color deviation tendency when the tone correction is applied to the image using a reference tone correction characteristic;
a changing unit configured to change the reference tone correction characteristic according to the calculated saturated feature amount; and
a correction unit configured to perform the tone correction based on the reference tone correction characteristic changed by said changing unit,
wherein said changing unit weakens a degree of the reference tone correction characteristic of the tone correction when the saturated feature amount indicates a stronger tendency toward color deviation.

2. The image processing apparatus according to claim 1, wherein the plurality of feature amounts include a chromatic value.

3. The image processing apparatus according to claim 2, wherein the saturated feature amount takes a value which represents a stronger tendency toward color deviation when any of the chromatic values of the respective blocks is larger than a predetermined chromatic value.

4. The image processing apparatus according to claim 1, wherein the plurality of feature amounts include a brightness value.

5. The image processing apparatus according to claim 4, wherein the saturated feature amount takes a value which represents a stronger tendency toward color deviation when any of the brightness values of the respective blocks is larger than a predetermined brightness value.

6. The image processing apparatus according to claim 1, further comprising a detection unit configured to detect a predetermined subject in the image,
wherein said changing unit makes a change to weaken degree of the tone correction to a lesser extent when the subject is detected than when the subject is not detected.

7. The image processing apparatus according to claim 1, wherein said calculation unit calculates the feature amounts of each of the blocks using signal values of pixels whose luminance values are within a predetermined range.

8. The image processing apparatus according to claim 1, wherein:
said image dividing unit divides the image into blocks of a plurality of different sizes by determining variances of larger blocks, and dividing the blocks whose variances are equal to or smaller than a threshold into larger blocks while dividing the blocks whose variances are larger than the threshold into smaller blocks; and
said calculation unit calculates the saturated feature amount by assigning weights corresponding to sizes of the blocks to the plurality of feature amounts calculated for each of the blocks.

9. The image processing apparatus according to claim 1, wherein said calculation unit calculates the plurality of feature amounts using average values of signal components of the pixels contained in the respective blocks.

10. The image processing apparatus according to claim 1, wherein said calculation unit calculates the saturated feature amount from the plurality of feature amounts using a boundary value calculated such that more than a predetermined number of signal components of the pixels which exceed the boundary value will be contained in each of the blocks.

11. An image processing method for performing tone correction of luminance of an image in an image processing apparatus, comprising:
a block dividing step of dividing the image into a plurality of blocks;

a calculation step of calculating a plurality of feature amounts of each of the blocks including a luminance value and calculating a saturated feature amount based on the plurality of calculated feature amounts, wherein the saturated feature amount represents color deviation tendency when the tone correction is applied to the image using a reference tone correction characteristic;

a changing step of changing the reference tone correction characteristic according to the calculated saturated feature amount; and a correction step of performing the tone correction based on the reference tone correction characteristic changed by said changing step, wherein said changing step weakens a degree of the reference tone correction characteristic of the tone correction when the saturated feature amount indicates a stronger tendency toward color deviation.

12. A non-transitory readable storage medium having stored thereon a program which is executable by an image processing apparatus, the program having a program code for realizing the image processing method according to claim 11.

13. An image processing apparatus adapted to perform tone correction of luminance of an image, comprising:
an image dividing unit configured to divide the image into a plurality of blocks;
a calculation unit configured to calculate a luminance value and a chromatic value of each of the blocks;
a correction unit configured to perform the tone correction based on the luminance values and the chromatic values,
wherein said correction unit performs a weaker tone correction as a number of blocks having the chromatic values which are larger than a predetermined value increases.

14. The image processing apparatus according to claim 13, wherein said calculation unit calculates a brightness value of each of the blocks, and said correction unit performs a weaker tone correction as a number of blocks having the brightness values which are larger than a predetermined value increases.

15. The image processing apparatus according to claim 13, further comprising a detection unit configured to detect a predetermined subject in the image,
wherein said correction unit performs a weaker tone correction in a case where the subject is not detected than in a case where the subject is detected.

16. The image processing apparatus according to claim 13, wherein said calculation unit calculates the chromatic value of each of the blocks using signal values of pixels whose luminance values are within a predetermined range.

17. The image processing apparatus according to claim 13, wherein said calculation unit calculates a saturated feature amount by calculating a weight of each of the blocks corresponding to the luminance value and the chromatic value of each of the blocks, and said correction unit performs the tone correction based on the saturated feature amount.

18. An image processing apparatus adapted to perform tone correction of luminance of an image, comprising:
an image dividing unit configured to divide the image into a plurality of blocks;
a calculation unit configured to calculate a luminance value and a brightness value of each of the blocks;
a correction unit configured to perform the tone correction based on the luminance values and the brightness values,
wherein said correction unit performs a weaker tone correction as a number of blocks having the brightness values which are larger than a predetermined value increases.

19. An image processing method for performing tone correction of luminance of an image in an image processing apparatus, comprising:
an image dividing step of dividing the image into a plurality of blocks;
a calculation step of calculating a luminance value and a chromatic value of each of the blocks;
a correction step of performing the tone correction based on the luminance values and the chromatic values,
wherein said correction step performs a weaker tone correction as a number of blocks having the chromatic values which are larger than a predetermined value increases.

20. An image processing method for performing tone correction of luminance of an image in an image processing apparatus, comprising:
an image dividing step of dividing the image into a plurality of blocks;
a calculation step of calculating a luminance value and a brightness value of each of the blocks;
a correction step of performing the tone correction based on the luminance values and the brightness values,
wherein said correction step performs a weaker tone correction as a number of blocks having the brightness values which are larger than a predetermined value increases.

* * * * *